United States Patent [19]
Sutrina et al.

[11] Patent Number: 5,466,974
[45] Date of Patent: Nov. 14, 1995

[54] ELECTRIC POWER DISTRIBUTION MODULE FOR AN ELECTRIC POWER GENERATION AND DISTRIBUTION SYSTEM

[75] Inventors: Thomas Sutrina, Rockford; Lawrence E. Crowe, Lindenwood; Edward W. Smith, Pecatonica; Ronald F. Peterson; Richard J. Hoppe, both of Rockford, all of Ill.

[73] Assignee: Sundstrand Corporation, Rockford, Ill.

[21] Appl. No.: 19,507

[22] Filed: Feb. 19, 1993

[51] Int. Cl.$^6$ .................................................. H02J 1/00
[52] U.S. Cl. ............................ 307/38; 361/622; 361/623
[58] Field of Search ................................ 361/622–624, 361/627, 628, 630, 631, 634, 636, 637, 640, 644, 646–648, 652, 656, 728, 729; 307/19, 23, 38; 174/70 B, 71 B, 72 B, 88 B, 99 B, 129 B

[56] References Cited

U.S. PATENT DOCUMENTS

| | | | |
|---|---|---|---|
| 959,762 | 5/1910 | Lake et al. | 361/631 |
| 3,005,934 | 10/1961 | Vogelsberg | 361/638 |
| 3,267,333 | 8/1966 | Schultz | 361/174 |
| 3,325,693 | 6/1967 | Stanback | 361/635 |
| 4,321,645 | 3/1982 | Thom et al. | 307/19 |
| 4,386,278 | 5/1983 | Kawada et al. | 361/637 |
| 4,403,292 | 9/1983 | Ejzak et al. | 307/19 |
| 5,065,283 | 11/1991 | Adachi et al. | 361/407 |
| 5,274,528 | 12/1993 | Noschese et al. | 361/637 |

FOREIGN PATENT DOCUMENTS

3344813A1  6/1984  Germany.

Primary Examiner—William M. Shoop, Jr.
Assistant Examiner—Peter Ganjoo
Attorney, Agent, or Firm—Lawrence E. Crowe

[57] ABSTRACT

This invention relates to an electric power generation and distribution system, and more particularly to an electric power distribution module for use in such systems, having an insulative support structure which includes integral therewith electrically conductive means which define a circuit for distributing electric power received from one or more power sources to one or more electrical loads, the insulative support structure also including integral therewith current sensing means for sensing a flow of electrical current in the electrically conductive means.

47 Claims, 9 Drawing Sheets

ELECTRIC POWER DISTRIBUTION MODULE FOR AN ELECTRIC POWER GENERATION AND DISTRIBUTION SYSTEM

FIELD OF INVENTION

This invention relates to an electric power generation and distribution system, and more particularly to an electric power distribution module for use in such systems, having an insulative support structure which includes integral therewith electrically conductive means which define a circuit for distributing electric power received from one or more power sources to one or more electrical loads, the insulative support structure also including integral therewith current sensing means for sensing a flow of electrical current in the electrically conductive means.

BACKGROUND OF INVENTION

In a typical aircraft electric power generation and distribution system, for which the instant invention is particularly suited, it is required that electric power generated by multiple power sources be effectively distributed to provide power to multiple electrical loads.

The power sources typically include one or more primary generators operatively connected to be driven by the propulsion engines, an auxiliary generator driven by a small gas turbine, emergency generators driven by an emergency power unit turbine, or by a ram air turbine and one or more batteries. One or more external power connectors are also typically required to provide electric power to at least a portion of the electrical loads during periods when the aircraft is on the ground and the propulsion engines are shut down.

The type of electrical loads for a given aircraft will vary, depending particularly on whether the aircraft is a military fighter type aircraft or a commercial airliner. In general, however, virtually all modern aircraft, whether military or commercial, have a number of flight critical loads such as avionic equipment required for communication and navigation, electromechanical actuation equipment required for manipulation of flight control surfaces, and electric motor driven fuel pumps and control valves. Additional electrical load equipment for environmental control, de-icing, and lighting is also usually required. Military aircraft also require electric power for weaponry, fire control radars and computers, and electronic warfare equipment. Commercial aircraft also require additional electric power for passenger comfort equipment such as galleys and lavatories.

In general, during normal flight operations, virtually all of the electric power required by the aircraft is supplied by the primary generators, augmented during takeoff and landing operations by the auxiliary generator. When the aircraft is on the ground, power is typically supplied by the auxiliary generator or from ground service carts by means of the external power connectors. Should an emergency condition occur during flight, such as the loss of a propulsion engine, the various auxiliary, emergency, and battery power sources are utilized to provide electric power to at least certain flight critical loads which allow the aircraft to be safely maneuvered until the engine can be re-started or safely landed with the propulsion engine nonoperative.

From the foregoing, it will be appreciated that the electric power generation and distribution system of a modern aircraft is quite complex and, of necessity, includes a high degree of redundancy and flexibility to allow operation of the aircraft in a variety of normal and emergency operational modes, both in flight and on the ground. It will also be appreciated that some means of selectively interconnecting the various power sources and loads, and means for sensing and controlling the configuration of the electric power system, must be provided if the inherent flexibility and redundancy of the electric power system are to be effectively utilized.

Since the various power sources and loads are physically distributed throughout the aircraft, such means for selectively interconnecting is typically provided by a network of feeder cables and wires emanating from the sources and loads and interconnected at various points by switching or protective devices such as contactors, remotely controllable circuit breakers, or fuses. In order that the electric power system may be reconfigured to suit various operational modes, it is customary to provide one or more common connection points, known as load buses, to which the various power sources and loads may be attached. It is also customary where multiple load buses are utilized to provide a tie bus such that the individual load buses may be interconnected in a variety of configurations to allow further flexibility and redundancy in the electric power system.

With such a complex and flexible electric power system, some means of automatically monitoring both the configuration and the health of the system, as well as means for controlling the various interconnections, must be provided to avoid overburdening the pilot and crew of the aircraft. It is customary, therefore, to provide a control circuit having multiple current sensing devices, such as current transformers (CTs), which sense a flow of electric current in the various feeders and wires and provide this information to control units, such as generator control units (GCU) or bus control units (BCU) which are electrically connected to receive additional input regarding desired system configuration from the flight deck and further electrically connected to open or close the various contactors and remotely controllable circuit breakers of the electric power system. U.S. Pat. Nos. 4,321,645 and 4,403,292, assigned to the assignee of the instant invention, provide further details of both the construction and operation of such means for monitoring and controlling an aircraft electric power system.

In the past, it has been customary to route the various feeder cables and wires through the aircraft structure to a centralized electric power center (EPC) in which the various switching and sensing devices, such as the various contactors, circuit breakers, fuses, and sensors used for interconnecting the power sources and loads, were co-located. Customarily, the various switching, protection, and sensing devices have been discrete components mounted on a wall or other structure within the electric power center (EPC) and electrically interconnected by wires and cables. This approach provided significant advantages in that the switching and sensing devices could be commonly used in different aircraft electric power systems by simply changing the interconnecting wires and cables within the electric power center.

The common electric power center approach also has significant disadvantages, however. Such electric power centers are physically quite large to allow room for the interconnecting wires and cables which are typically large in diameter to carry the required current without overheating and therefore relatively inflexible, thereby requiring large bend radii. Such electric power centers are also highly labor intensive and therefore expensive to assemble, with the electric power center for a typical three-engine commercial airliner requiring as much as 500 man hours of skilled labor to complete final assembly. Since the interconnecting wires and cables are large and inflexible, their length must be tightly toleranced, thereby driving up the cost. Maintenance and repair are often difficult since a large number of wires may need to be sequentially removed and replaced in order to gain access to and replace a failed component.

While the customary approach of grouping the interconnecting wires, cables, switching and sensing components together in a central location does facilitate interconnection, there are costs and, in some cases, additional safety risks involved. As previously described, centralized EPCs utilizing discrete components connected by wires and cables are large and must, therefore, typically be located in large spaces suitable for more productive uses such as a cargo bay, thereby occupying valuable space within the pressurized envelope of the aircraft, instead of other presently non-utilized small spaces within and outside the pressurized envelope. Additionally, with all electric power on the aircraft concentrated within a single EPC, great care must be taken in the design and operation of the aircraft such that a single event, such as a component failure within the EPC, an engine disintegration, or detonation of an explosive device on board the aircraft, cannot cause a total loss of electric power.

The instant invention is directed to overcoming one or more of the aforementioned problems and disadvantages.

SUMMARY OF THE INVENTION

It is, therefore, a primary object of the instant invention to provide an improved electric power generation and distribution system. Specifically, it is a primary object of the instant invention to provide an improved electric power generation and distribution system which is small in physical size and easily manufactured at low cost and which offers a high degree of installation location flexibility.

The instant invention achieves the foregoing objectives in an electric power generation and distribution system through the use of highly integrated, remotely mountable electric power distribution modules (EPDMs), each having an insulative support structure which includes integral therewith electrically conductive bus bars defining a circuit having an input electrically connected to one or more sources of electric power and an output connectable to one or more electrical loads. The insulative support structure also includes integral therewith current sensing devices for sensing a flow of electrical current within the bus bars. Circuit interrupt means in the form of jumper bars), switching devices such as contactors or remotely controllable circuit breakers, and protective devices such as fuses or manually resettable circuit breakers, may be mounted on the insulative support structure and operatively connected to conduct or interrupt the flow of current in the circuit defined by the bus bars.

In an exemplary embodiment of an electric power system for a twin engine commercial aircraft having right and left primary generators attached respectively to right and left main engines and an auxiliary generator driven by an auxiliary power unit (APU), the instant invention contemplates an electric power distribution system having two main load EPDMs, an auxiliary power EPDM, and two secondary load EPDMs to supply electric power to two galleys. In general, a majority of the individual electrical loads of the aircraft are equally divided between the two main load EPDMs, with one main load EPDM being designated as the right main load EPDM and electrically connected to receive power from the right primary generator, and the other main load EPDM being designated as the left main load EPDM and electrically connected to receive power from the left primary generator. In like fashion, the two galley load EPDMs are designated as the right and left galley load EPDMs and electrically connected to receive the power from the right and left main load EPDMs, respectively. The auxiliary load EPDM receives power from the auxiliary generator and supplies power to a small number of individual loads attached to a load bus within the auxiliary load EPDM or to either the right or left main load EPDM. A tie bus provides electrical connection between the right and left main load EPDMs and the auxiliary EPDM such that the right and left main load and auxiliary power EPDMs may alternatively receive power from either the right or left primary generators or the auxiliary generator. The various EPDMs of the exemplary embodiment may be housed within a central electric power center, as in prior electric power generation and distribution centers, or distributed throughout the aircraft to facilitate space utilization and provide improved damage tolerance. Due to the generally planar shape of the insulative support structure of the exemplary embodiment, the EPDMs may be utilized as bulkheads and as separation walls between pressurized and unpressurized spaces.

In an alternate embodiment of the insulative support structure, means are provided for reconfiguring connections between the bus bars and for adding or relocating current sensing means, thereby allowing the EPDM to be easily modified for use on alternate aircraft or to accommodate electrical system growth.

In another alternative embodiment, the insulative support structure further includes electrically conductive means in the form of traces defining a control and sensing circuit electrically connecting the integral current sensing means to an electrical connector for coupling to a control unit, such as a GCU or BCU.

Other objectives and advantages of the instant invention will become apparent from the following specification, taken in conjunction with the accompanying drawings.

DESCRIPTION OF THE PREFERRED EMBODIMENT

Figures 1, 1A:
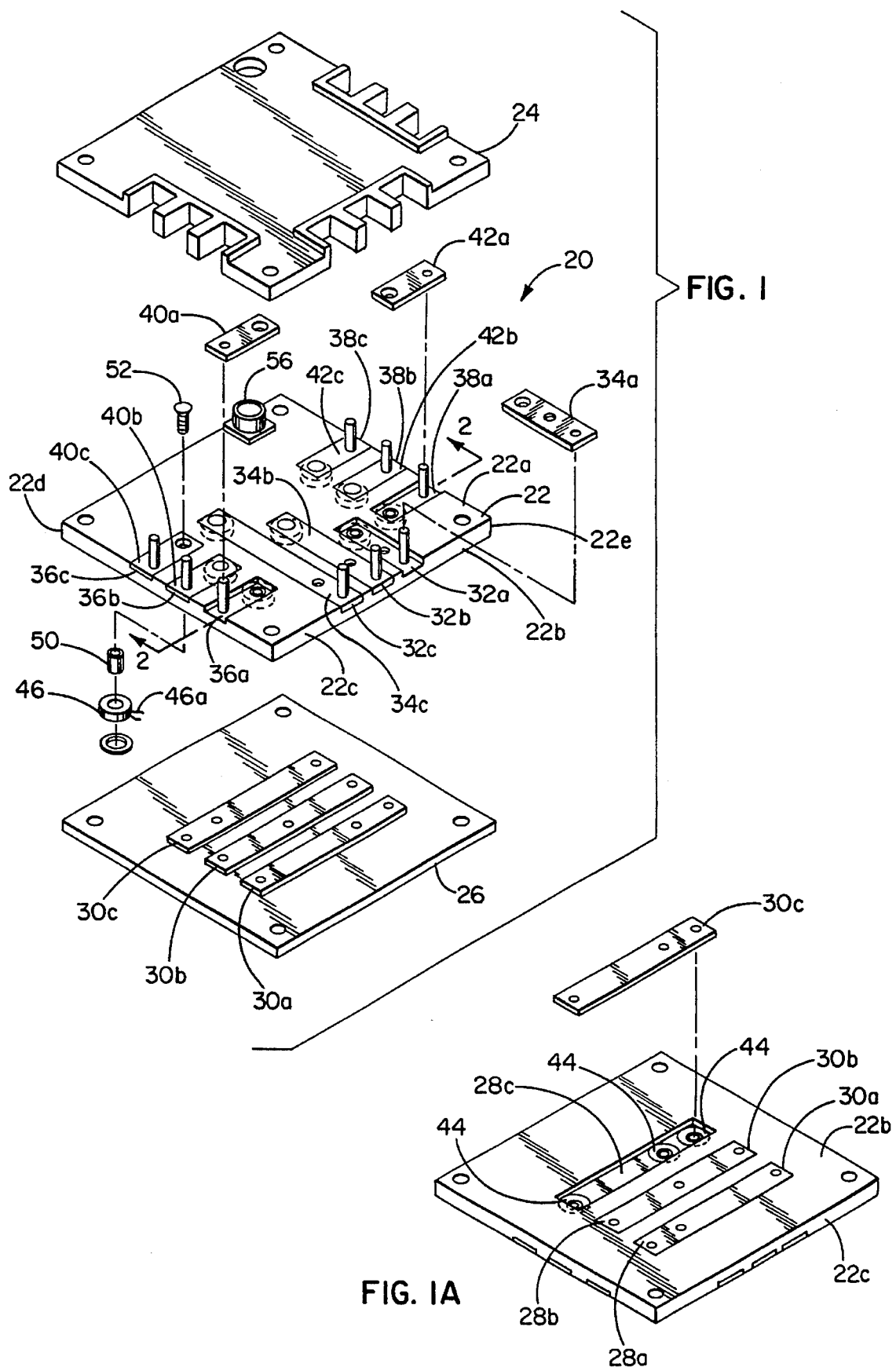
FIG. 1 is an exploded isometric view of a first embodiment of an electric power distribution module according to the invention.
FIG. 1a is an isometric bottom view of a portion of the embodiment of FIG. 1.

Referring now to FIG. 1, a first exemplary embodiment of an electric power distribution module is provided in the form of a planar combiner/splitter EPDM, generally designated 20. The combiner/splitter EPDM 20 includes a rectangular laminated support structure of electrically insulative material having generally planar, rectangular shaped, top and bottom plates 24, 26 mating with a top and a bottom surface 22a, 22b, respectively, of a generally planar, rectangular shaped, center plate 22. The center plate 22 includes in the bottom surface thereof three non-intersecting channels 28a, 28b, 28c, as best seen in FIG. 1a, oriented generally parallel to a first rectangular edge 22c of the center plate 22 for receipt respectively therein of three connector bus straps 30a, 30b, 30c such that the connector bus straps, 30a, 30b, 30c do not protrude beyond the bottom surface 22b of the center plate 22, the center plate 22 thus providing electrical isolation between the connector bus straps 30a, 30b, 30c. Returning to FIG. 1, the center plate 22 further includes in the top surface 22a thereof three non-intersecting grooves 32a, 32b, 32c extending generally perpendicular to and respectively across channels 28a, 28b, 28c from the first rectangular edge 22c of the center plate 22 for receipt respectively therein of output terminal buses 34a, 34b, 34c in a manner such that the output terminal buses 34a, 34b, 34c do not protrude above the top surface 22a of the center plate 22, the center plate 22 thereby providing electrical isolation between the output terminal buses 34a, 34b, 34c and the connector bus straps 30a, 30b, 30c. Output terminal buses 34a, 34b, 34c extend generally from the first edge or sidewall 22c of the center plate 22 to respectively cross connector bus straps 30a, 30b, 30c. The center plate 22 further includes in the top surface 22a thereof three non-intersecting grooves 36a, 36b, 36c and three non-intersecting grooves 38a, 38b, 38c for receipt respectively therein of first input buses 40a, 40b, 40c and second input buses 42a, 42b, 42c in a manner such that the first and second input buses 40a–c, 42a–c do not protrude above the top surface 22a of the center plate 22 and such that the center plate 22 provides electrical isolation between the input buses 40a–c, 42a–c, the output buses 34a–c, and the connector bus straps 30a–c. The first and second input buses 40a–c, 42a–c are generally aligned above and parallel to the bus connector straps 30a–c, with first and second input buses 40a, 42a extending respectively from opposite rectangular edges 22d, 22e adjacent to rectangular edge 22c to overlap opposite ends of connector bus strap 30a. In like fashion, first input buses 40b, 40c extend from rectangular edge 22d and second input buses 42b, 42c extend from rectangular edge 22e to respectively overlap opposite ends of the bus connector straps 30b, 30c.

Figure 2:
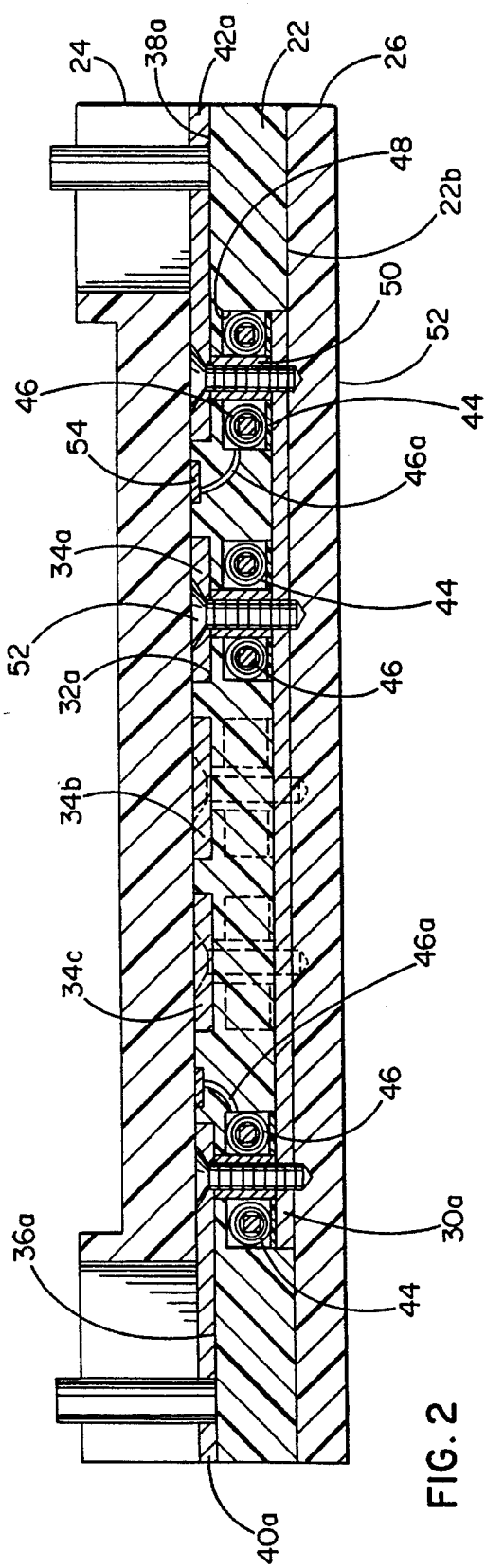
FIG. 2 is a vertical section taken along a plane indicated by 2—2 of FIG. 1.

As best seen in FIG. 2, at each crossing or overlapping of the connector strap 30a by the first and second input buses 40a, 42a and the first output bus 34a, the center plate 22 includes a recess 44 extending from the lower surface 22b partly through the center plate 22 for receipt therein of a toroidal current transformer 46. The center plate 22 further includes at each crossing or overlapping a hole 48 connecting the grooves 32a, 36a, 38a to the respective recess 44 at each crossing or overlapping. The hole 48 and toroidal CT are oriented such that an electrically conductive tubular standoff 50 may pass through the holes 48 and the center of the current transformer 46 to provide electrical connection between the bus connector strap 30a, the first and second input buses 40a, 42a and the output bus 34a such that electrical currents flowing from first and second input buses 40a 42a are combined by means of bus connector strap 30a and supplied in combination to output bus 34a. At each crossing or overlapping, a screw 52 passing through the input and output buses 40a, 42a, 34a and the tubular standoff 50 and threaded into the connector bus strap 30a ensures that electrical connection is maintained.

In like fashion, first and second input buses 40b, 42b, connector bus strap 30b, and output bus 34b are interconnected by tubular standoffs 50 and screws 52 with current transformers 46 about each standoff 50 such that electrical currents flowing from the first and second input buses 40b, 42b are combined by means of bus connector strap 30b and supplied in combination to output bus 34b. Similarly, first and second input buses 40c, 42c, connector bus strap 30c, and output bus 34c are interconnected by tubular standoffs 50 and screws 52 with current transformers 46 about each tubular standoff 50 such that electrical currents flowing from the first and second input buses 40c, 42c are combined by connector strap 30c and provided to output bus 34c.

As best seen in FIG. 2, electrical lead wires 46a from each CT 46 are connected to electrically conductive traces 54 embedded in the center plate 22. The traces 54 are routed to an electrical connector 56 mounted on the center plate 22, the traces 54 being electrically terminated to pins (not shown) within the electrical connector 56 for connection to control circuitry external to the EPDM.

The top and bottom plates 24, 26 are bonded adhesively or by means of mechanical fasteners such as rivets or screws to the top and bottom surfaces 22a, 22b respectively of the center plate 22 to provide electrical insulation of the buses and connector straps.

When the combiner/splitter EPDM is utilized in the combining mode, a plurality of electrical currents from a plurality of power sources attached to the first and second input buses 40a–c, 42a–c will be combined into three output current sources available at output buses 34a–c. The provision of CTs 46 at each connection of an input or output bus to the connector straps, as previously described, allows individual input and output currents to be monitored and compared by control circuitry external to the EPDM.

An example of an application wherein such a combiner EPDM finds particular utility is provided by an aircraft electric power system having parallel feeder cables supplying three-phase 400HZ electrical current to a load bus. Aircraft electric power systems often utilize such an approach to achieve weight reduction in aircraft having long feeder cables connecting a power source such as a main generator to an electrical load distribution point. With such a parallel feeder approach, the feeders for the three phases of alternating current are split into three pairs of parallel feeders and recombined at the combiner EPDM by attaching one feeder of a given pair to a first input bus, such as first input bus 40*a*, and attaching the other feeder of the given pair to a corresponding second input bus which would be second input bus 42*a* for first input bus 40*a*, with the combiner EPDM providing a recombined current output of the given feeder pair on the corresponding output bus, which, for input buses 40*a* 42*a*, would be 34*a*. The feeder pairs for the other two phases are recombined in like manner utilizing corresponding first and second inputs and outputs 40*b*, 42*b*, 34*b*, and 40*c*, 42*c*, 34*c* of the exemplary embodiment of the combiner/splitter EPDM shown in FIG. 1.

When such a parallel feeder approach is utilized, it is usually required that currents flowing in each member of a given feeder pair be monitored in addition to the combined current in order to detect a fault condition such as a shorted or open circuit condition in any of the paralleled or combined portions of the feeder.

Those skilled in the art of aircraft electric power systems will recognize that, by incorporation of the CTs 46, and through the utilization of the various buses and connector straps, as illustrated by the exemplary embodiment, the instant invention provides means for accomplishing the required recombination and current sensing functions in a manner which is considerably more compact and offers considerable improvements in ease of installation and repair in comparison to prior approaches wherein the CTs were discrete components with the feeders passing therethrough.

It will be appreciated that the combiner/splitter EPDM may also be utilized with equal advantage in a reverse manner from the foregoing description wherein a single electrical current supplied to one of the output buses 34*a*–*c* would be split into two current sources available at the corresponding first and second input buses. It will also be appreciated that, by varying the configuration, interconnection, and number of the bus and current sensing means which are included in the EPDM, a virtually unlimited number of alternate configurations of the basic combiner/splitter EPDM may be provided. It should be further appreciated that, in a specific application, it may not be required that each possible current path within the EPDM be provided with a current sensor, and that, by utilizing other types of current sensors, such as hall effect devices or shunt resistors in place of the current transformers 46 of the exemplary embodiment, the invention may be utilized to equal advantage within direct current electric power systems.

Figure 3:
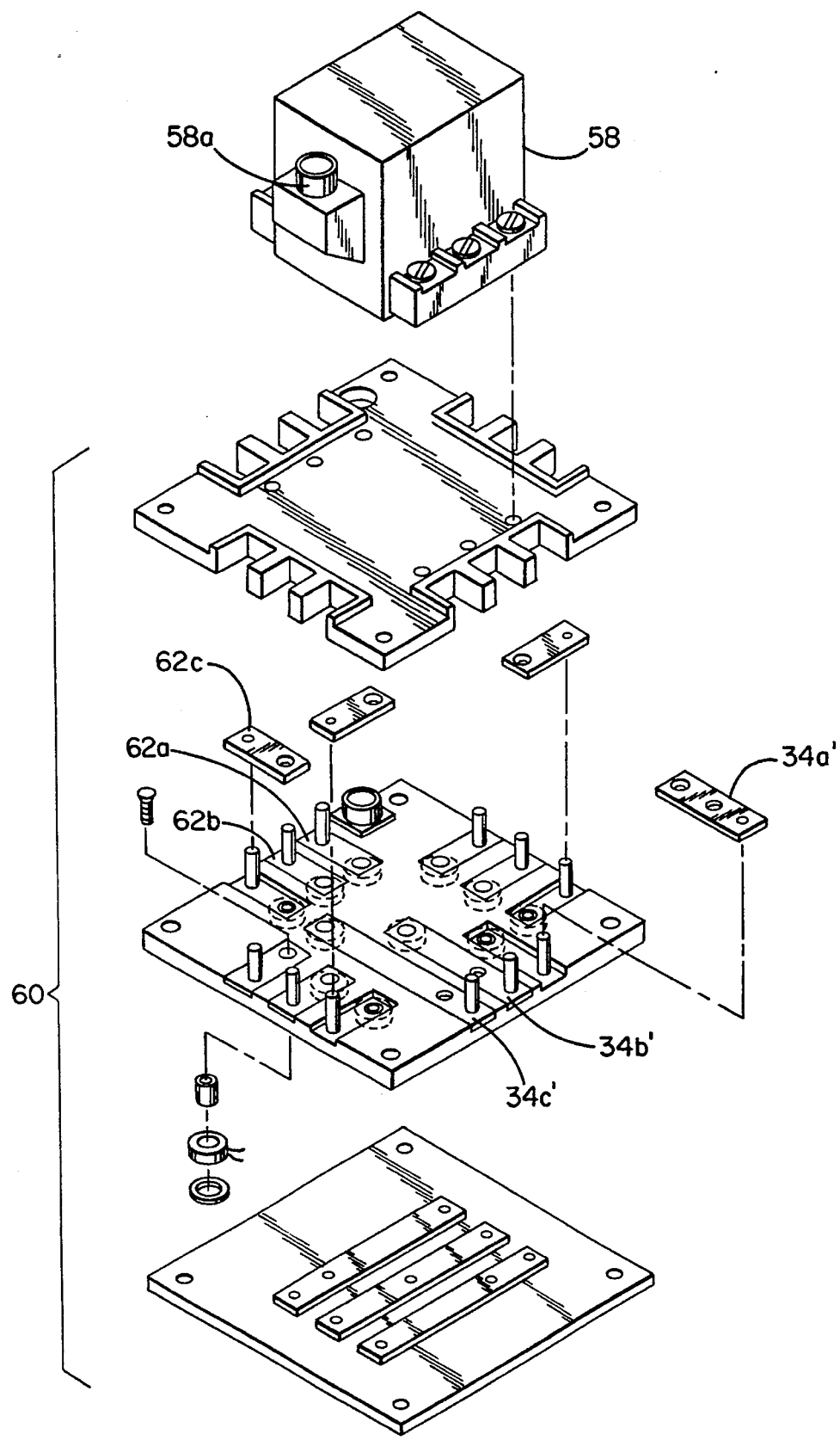
FIG. 3 is an exploded isometric view of a second embodiment of an electric power distribution module according to the invention.

A second exemplary embodiment of an electric power distribution module of the instant invention is illustrated in FIG. 3. In the second exemplary embodiment, one or more electrical contactors are mounted on a baseplate, generally designated 60, having an insulative structure including integral therewith bus means and current sensing for sensing a flow of current in the bus means and, in general, being constructed in a manner similar to the first exemplary embodiment as described hereinbefore.

Specifically, the second exemplary embodiment of the instant invention, as shown in FIG. 3, wherein identical "primed" numbers will be utilized to reference identical components or elements previously described in relation to FIGS. 1 and 2, utilizes a baseplate 60, constructed identically to the combiner/splitter EPDM 20 of the first embodiment with an additional set of three second output terminal buses 62*a*, 62*b*, 62*c* embedded in the insulative support structure of the baseplate 60 in a manner to be electrically isolated from the various buses and connector straps of the combiner/splitter EPDM 20. A three-phase contactor 58 is provided to open or close a current flow path between output buses 34*a'*, 34*b'*, 34*c'* and second output buses 62*a*, 62*b*, 62*c* respectively in response to signals received from an external control circuit by means of an electrical control connector 58*a* of the contactor 58.

Figure 4:
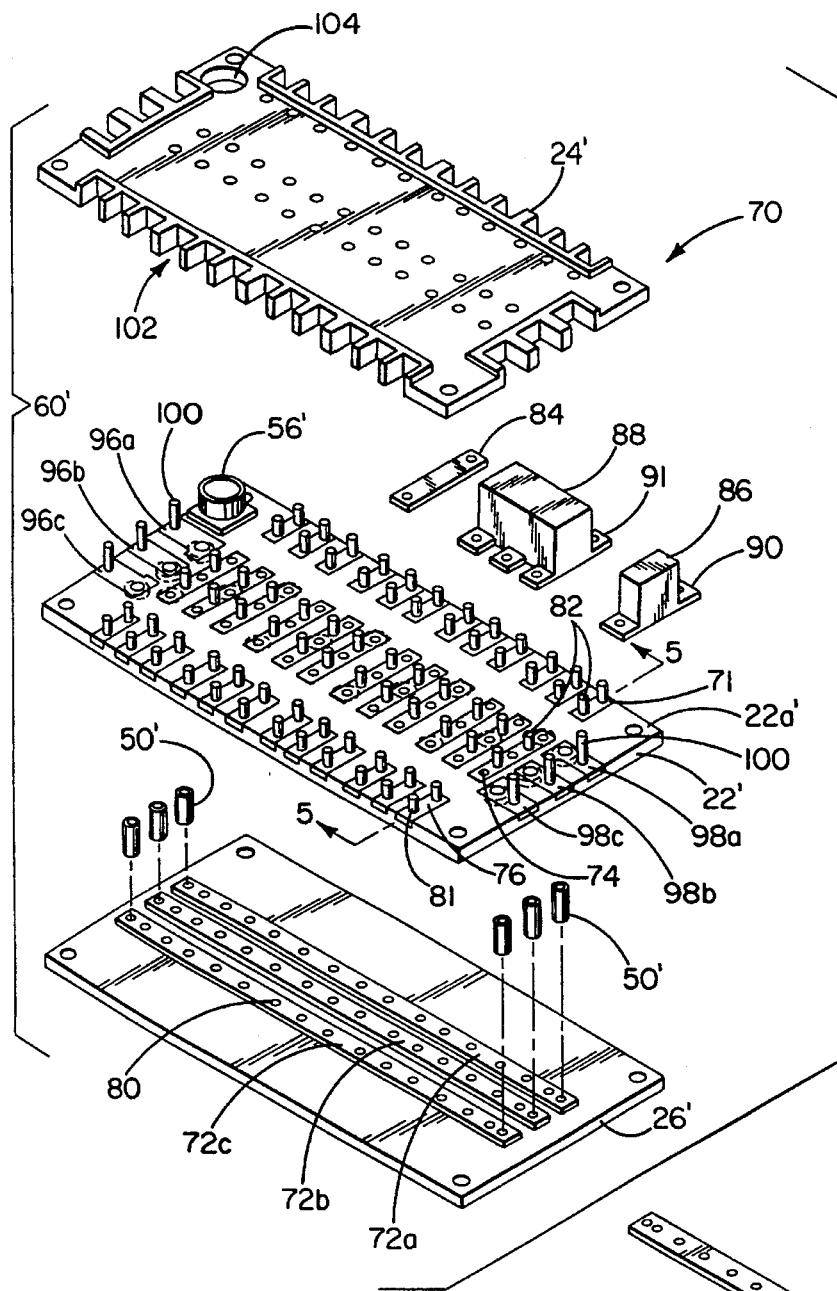
FIG. 4 is an exploded isometric view of a third embodiment of an electric power distribution module according to the invention.

A third exemplary embodiment of the instant invention is provided in the form of a main bus and load distribution panel EPDM 70, generally designated as illustrated in FIG. 4, which is constructed and operated in a manner similar to the first and second exemplary embodiments to distribute electrical current received from one or more sources to a plurality of electrical loads. The third exemplary embodiment of the instant invention further includes provisions for incorporating circuit interrupt means in the form of jumper buses, fuses, and circuit breakers into the output buses. The third exemplary embodiment further includes means for selectively altering the configuration of bus means and a current sensing circuit within a baseplate of the EPDM through the use of moveable interconnect means and plug-in CT modules.

Figure 5:
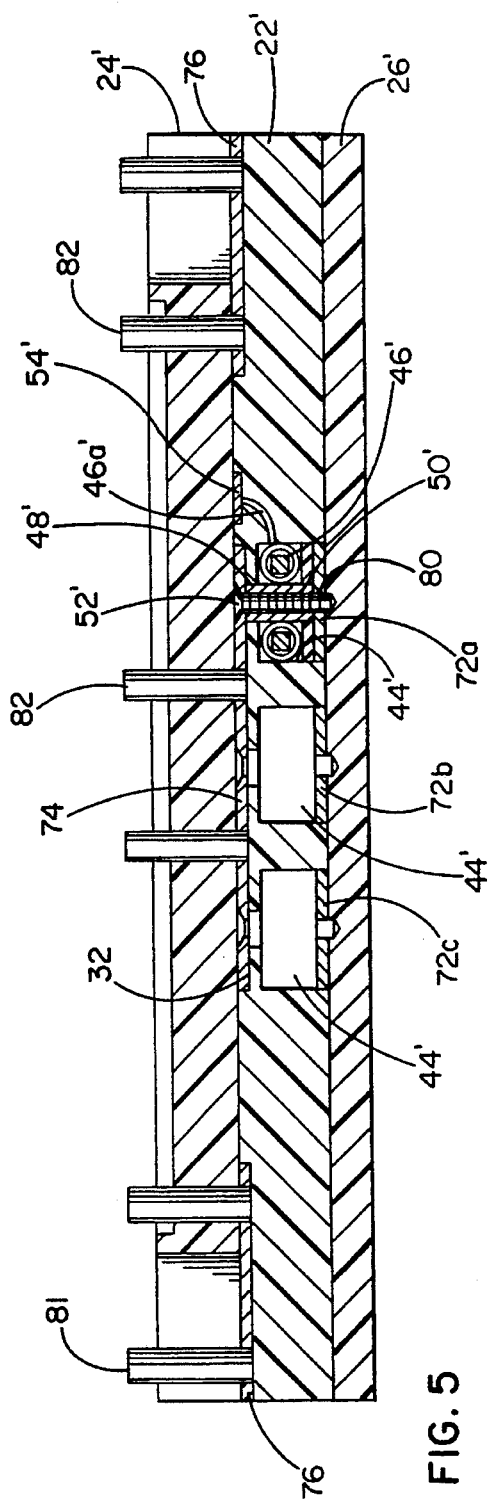
FIG. 5 is a vertical section taken along a plane indicated by 5—5 of FIG. 4.
Figure 4A:
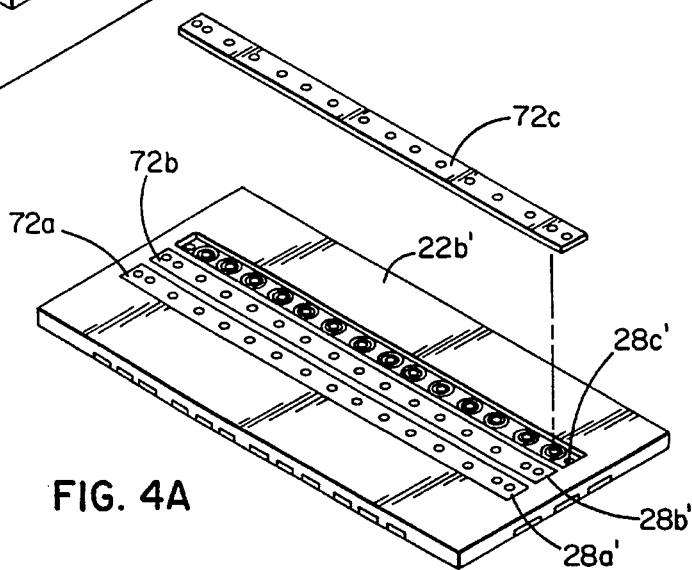
FIG. 4a is an isometric bottom view of a portion of the embodiment of FIG. 4.

Specifically, with reference to FIGS. 4 and 5, the load distribution EPDM -70 wherein identical "primed" numbers will be utilized to reference identical components or elements previously described in relation to FIGS. 1–3, includes a rectangular generally planar support structure of insulative material in the form of a baseplate 60'. The baseplate 60' includes generally planar top, center and bottom plates 24', 22', 26', the top and bottom plates 24', 26' mating respectively with top and bottom surfaces 22*a'*, 22*b'* of the center plate 22'. The lower surface 22*b'* includes, as best seen in FIG. 4*a*, three non-intersecting channels 28*a'*, 28*b'*, 28*c'* for receipt respectively therein of load bus bars 72*a*, 72*b*, 72*c*. The top surface 22*a'* includes a plurality of non-intersecting grooves, as shown at 32, for receipt therein of a plurality of connector straps 74 and terminal buses 76, with the connector straps 74 being aligned generally transversely to the load bus bars 72*a*–*c*, the connector straps 74, and the terminal buses 76 being disposed within the channels 28*a*–*c* and grooves 32 in a manner so as not to protrude above the top and bottom surfaces 22*a'*, 22*b'* of the center plate 22', and individually electrically isolated by the center plate 22'.

As best seen in FIG. 5, at each crossing of a connector strap 74 and a load bus bar 72, a hole 48' and a recess 44' are provided in the center plate, the hole and recess being configured for receipts respectively therein of a tubular standoff 50' and a CT 46'. At each crossing, the connector straps 74 include a perforation, as seen at 78, and the load bus bars 72 include a threaded hole, as at 80, for insertion of a screw 52' such that any one of the connector straps 74 may be selectively electrically connected to any of the load bus bars 72*a*, 72*b*, 72*c* through the use of a tubular standoff 50' inserted in an appropriate hole 48' and secured therein by a screw 52' extending through the connector strap 74 and tubular standoff 50' and threaded into load bus bars 72*a*, 72*b'*, or 72*c*. If required, a CT 46' may be inserted within the recess 44' about the tubular standoff 50' such that a flow of electrical current through the tubular standoff 50' may be sensed and communicated to an external control circuit via leadwires 46*a'*, traces 54', and an electrical connector 56' in a manner previously described in connection with the first exemplary embodiment.

Returning to FIG. 4, it will be seen that each of the terminal buses 76 includes attachment means in the form of a threaded output stud 81 by which an electrical conductor, such as a wire, may be attached to electrically connect the terminal buses 76 to electrical loads or power sources external to the EPDM. The output buses 76 and connector straps 74 also include attachment means in the form of threaded interconnection studs 82, whereby, as best seen in FIG. 4, a circuit interrupt device such as a removable jumper bar 84, a fuse 86, or a circuit breaker 88 may be electrically connected between a connector strap 74 and a terminal bus 76 to allow selective connection of various loads to the load bus to the load bus bars 72a–c and protection for the load bus bars 72a–c against short circuit faults in the loads or in wiring connecting the loads to the output terminal buses 76.

It will be appreciated that such fuses 86 and circuit breakers 88 may be either single-phase devices, as shown at 90, or multiple-phase devices, as shown at 91 of FIG. 4. It will be further appreciated that the circuit breakers 88 may, in addition to providing overcurrent protection, be remotely controllable to open or close the current path to a given load or power source in response to signals supplied to the remotely controllable circuit breaker (RCCB) via an electrical connector of the RCCB by a control unit, such as a GCU or BCU. In general, the electrical connection between the load bus bars 72a–c and the load bus input/output terminals is provided by tubular standoffs 50' and screws 52' in the same manner as previously described for electrically connecting the connecting straps 74 to the load bus bars 72a–c. CTs 46' may also be included about the tubular standoffs 50' used to interconnect the load bus bars 72a–c and the load bus input/output terminals 96a–c, 98a–c if it is desired to monitor electrical currents entering or leaving the load bus bars 72a–c through the load bus input/output terminals 96a–c, 98a–c.

The top and bottom plates 24', 26' are adhesively or otherwise bonded to the top and bottom surfaces 22a', 22b' respectively of the center plate to provide complete electrical insulation about the load bus bars and connector straps, with the top plate having a bifurcated separation web 102 about each output stud 81 and large stud 100, and further having a through hole 104 about the electrical connector 56' to allow the connector 56' to pass through the hole 104 to protrude from the baseplate 60'.

Figure 6:
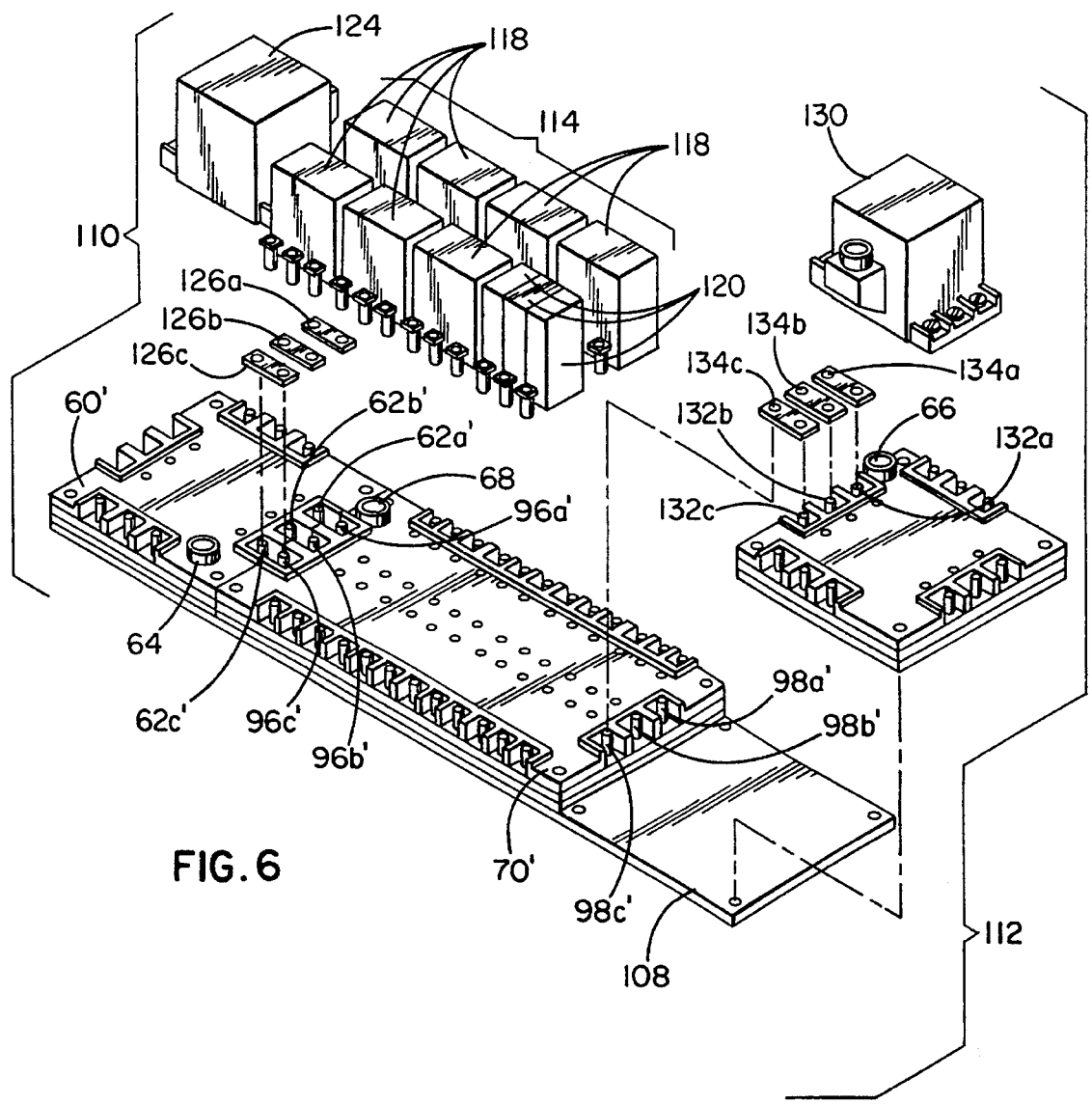
FIG. 6 is an exploded isometric view of a fourth embodiment of an electric power distribution module according to the invention.

A fourth exemplary embodiment of an EPDM, according to the instant invention, is provided as illustrated by FIG. 6 by combining on a common base 108 two EPDMs 110, 112, each having a contactor mounted on combiner/splitter EPDM baseplates, according to the second exemplary embodiment as previously described with reference to FIGS. 1–3, and a main bus and load distribution EPDM 114, according to the third exemplary embodiment as previously described with reference to FIGS. 4–5. Since many of the parts are the same as previously described, "primed" numbers are utilized to reference identical components or elements previously described in relation to FIGS. 1–5. Specifically, FIG. 6 illustrates an EPDM having a main load EPDM, generally designated 114, mounted upon a planar common base 108. Also mounted upon the base 108 at opposite ends of the main load EPDM 114 are a first and second combiner/splitter EPDMs 110, 112. The load bus EPDM section 114 includes a baseplate 70' identical in construction to the baseplate 70 of the third exemplary embodiment and further includes mounted thereupon seven, three-phase, remotely controllable circuit breakers (RCCBs) 118 and three single-phase fuses 120. The first combiner/splitter EPDM 110 includes a baseplate 60' identical in construction to the baseplate 60 of the second exemplary embodiment and further includes, mounted thereupon, a generator relay contactor (GR) 124. The output terminal buses 62a', 62b', 62c' of the first combiner/splitter EPDM 110 are connected respectively to the first input/output buses 96a', 96b', 96c' of the load bus EPDM section 114 by jumper bars 126a–c. In like manner, the second combiner/splitter EPDM 112 includes a baseplate 128 identical in construction to the baseplate 60 of the second exemplary embodiment and further includes, mounted thereupon, a tie bus relay contactor (TBR) 130. The output terminal buses 132a, 132b, 132c, which are equivalent to output terminal buses 62a–c of the second exemplary embodiment are electrically connected respectively to the second input/output buses 98a', 98b', 98c' of load bus EPDM section 114 by jumper bars 134a–c. Electrical connectors 64, 66, 68 are provided in the first and second combiner/splitter EPDMs and the main load EPDM 114 respectively for connection to external control means.

Figure 6A:
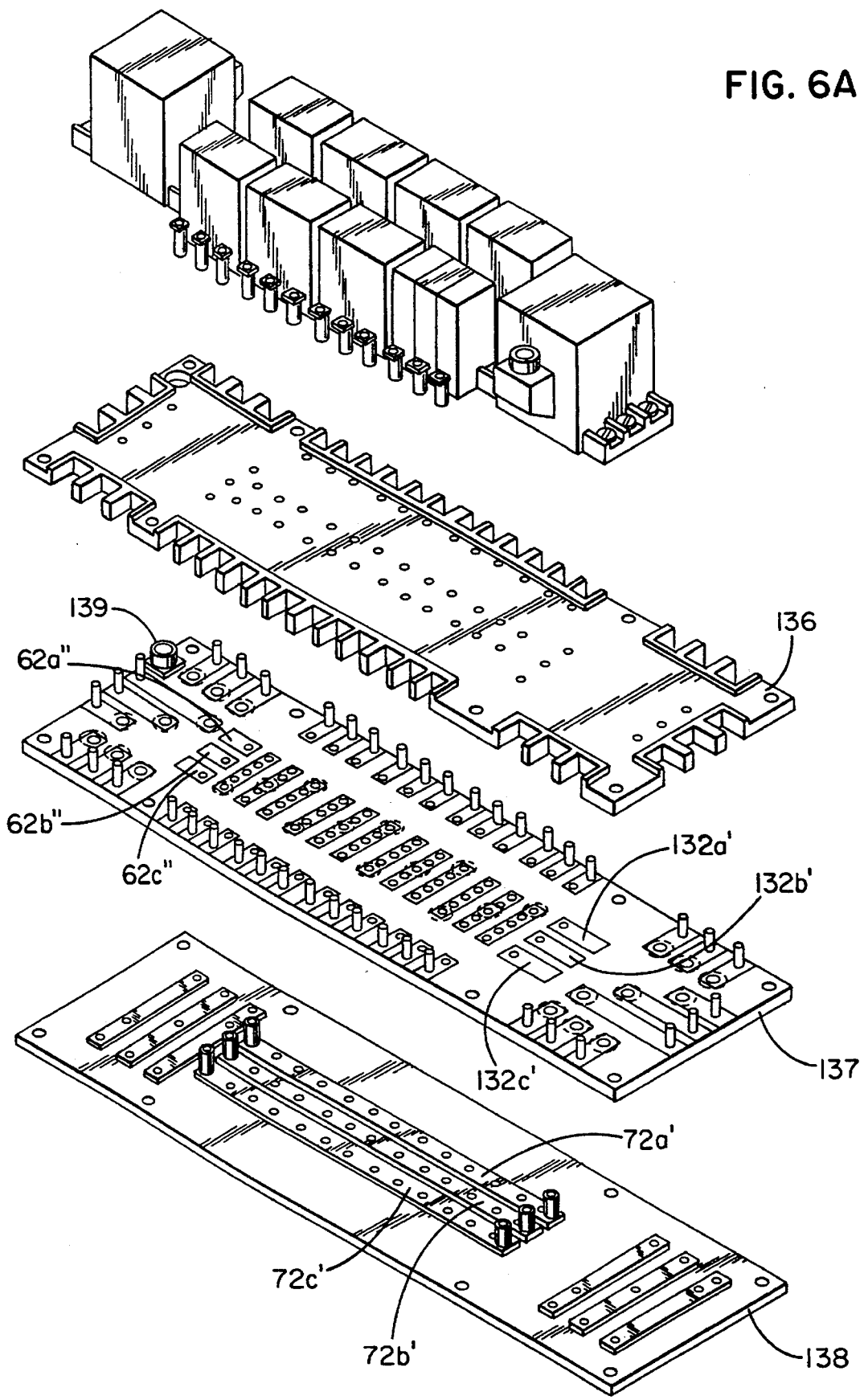
FIG. 6a is an exploded isometric view of a fifth embodiment of an electric power distribution module according to the invention.

An alternate construction for the fourth exemplary embodiment is provided by an EPDM as illustrated in FIG. 6a wherein the common base 108, jumper bars 126a–c, 134a–c, and input/output buses 96a'–c' and 98a'–c' are eliminated by utilizing a common insulative support structure having three plates 136, 137, 138 in place of plates 22, 24, 26, 22', 24', 26' and extending load bus bars 72a'–c' to connect directly to the output bus bars 62a''–c'', 132a'–c' of the first and second combiner/splitter EPDMs 110, 112, respectively. With this construction, the control signals may also be combined in a single electrical connector 139, thereby replacing connectors 64, 66, and 68 as provided for the exemplary embodiment illustrated in FIG. 6.

As previously stated, the instant invention is particularly suited for use in an aircraft electric power generation and distribution system. Accordingly, an exemplary aircraft electric power system will be utilized to illustrate further features and advantages of the instant invention.

Specifically, an exemplary embodiment is provided in the form of an electric power generation and distribution system for a twin engine aircraft with an auxiliary power unit. It will be understood, however, that the instant invention may be utilized with equal advantage with other aircraft electrical generation and distribution systems and with electric power generation and distribution systems of other types.

Figure 9:
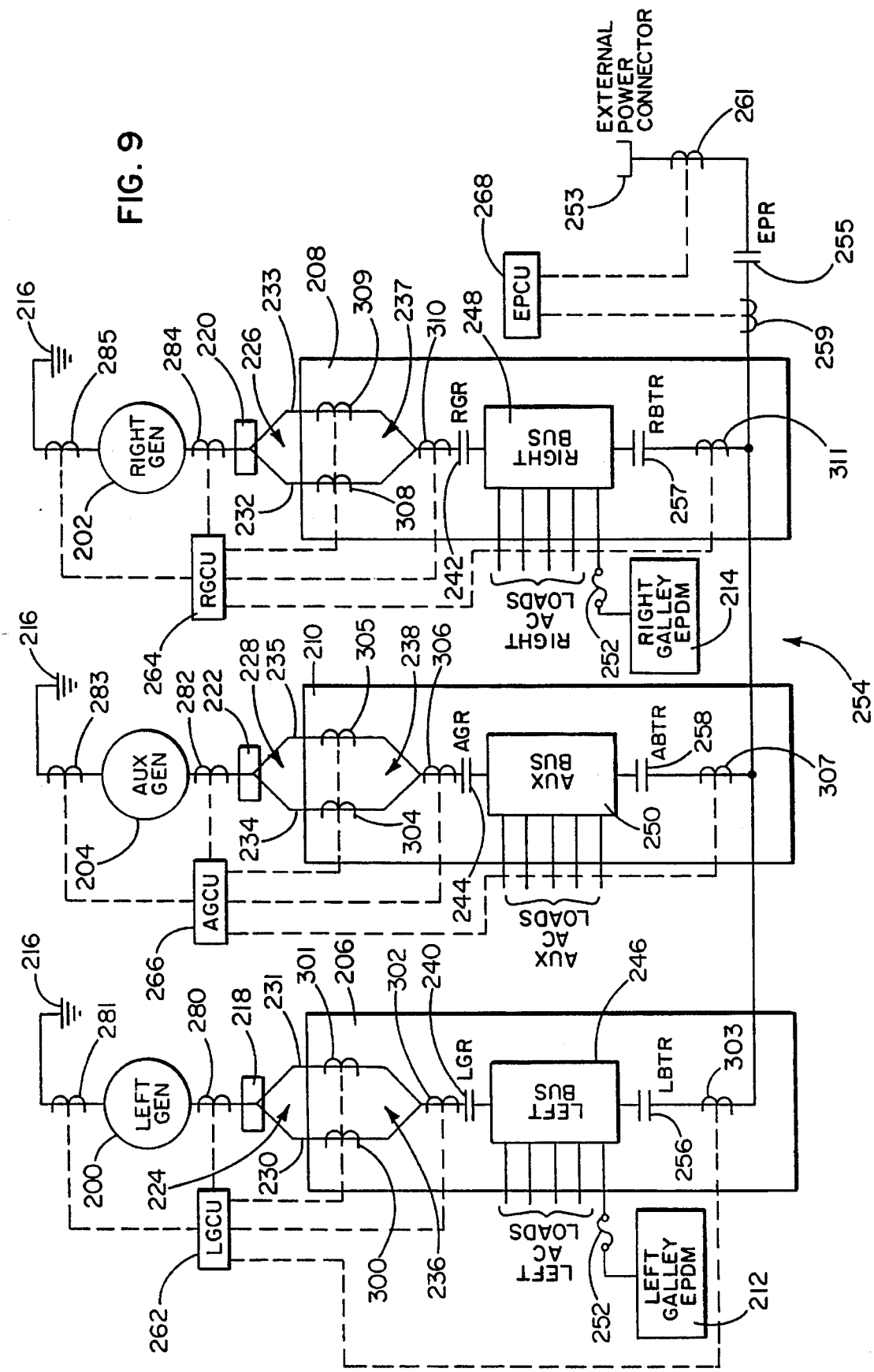
FIG. 9 is an electrical schematic of an exemplary embodiment of an aircraft electric power generation and distribution system according to the invention.
Figure 10:
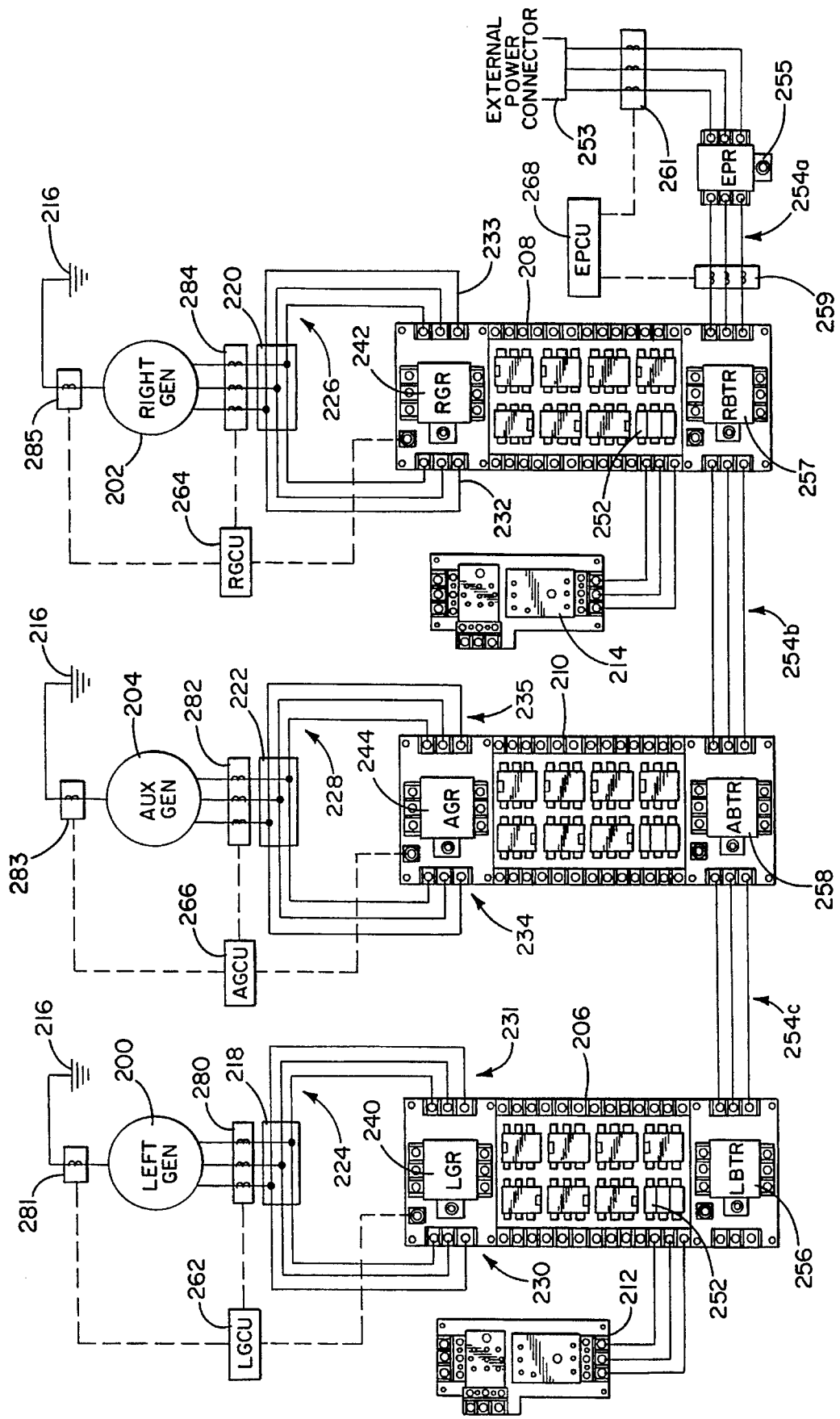
FIG. 10 is a wiring diagram of the exemplary embodiment illustrated by the electrical schematic of FIG. 9.

The exemplary embodiment, as illustrated diagrammatically in FIG. 10, and as illustrated schematically in FIG. 9 wherein a single line is utilized to indicate what may be multiple connections between elements, includes a plurality of power sources in the form of two primary generators 200, 202 and an APU generator 204, respectively designated LGEN, RGEN, APUGEN, and a main external power source (not shown). Electric power provided by the power sources is distributed to a plurality of electrical loads attached to a distributed load bus provided by bus means within left and right main load EPDMs 206, 208, an auxiliary power EPDM 210, and left and right galley load EPDMs 212, 214.

The left and right main load and auxiliary power EPDMs 206, 208, 210 are identical and are constructed in accordance with the fourth exemplary embodiment as illustrated by FIG. 6a.

The left, right, and auxiliary generators 200, 202, 204, which are referenced to a common ground 216, provide outputs to terminal blocks 218, 220, 222, respectively, and thence via parallel feeders 224, 226, 228 to first and second input terminal pairs 230, 231; 232, 233; 234, 235, respectively, of the left, right, and auxiliary main load EPDMs 206, 208, 210. Within each of the left and right main load and auxiliary power EPDMs combiner bus means, generally designated 236, 237, 238, respectively, as provided by the first and second input buses 40a–c, 42a–c, the tubular standoffs 50, bus connector straps 30a–c, and output terminal buses 62a'–c', as previously described with reference to the FIGS. 1–6a, combine electric current supplied to the first and second input terminals 230, 231, 232, 233, 234, 235 by the left, right, and auxiliary generators 200, 204, 206 and supply the combined electrical current to a left, right, and auxiliary generator relay (LGR), (RGR), (and AGR) 240, 242,246 for connection to the left and right main buses 246, 248 and the auxiliary bus 250, respectively. The left, right, and auxiliary buses are provided by bus means similar to load bus bars 72a–c as previously described with respect to FIGS. 1–6a. Additional bus means, RCCBs, and fuses within the left, right, and auxiliary main load EPDMs 206, 208, 210, similar to tubular standoffs 50, connector straps 74, and terminal buses 76, as previously described with reference to FIGS. 1–6a, are provided to allow attachment of a plurality of electrical loads including the left and right galley EPDMs 212, 214 to the left, right, and auxiliary buses 246, 248, 250, with the left and right buses 246, 248 through fuses 252.

In order that the left, right, and auxiliary buses may alternatively receive electric current from more than a single power source, a tie bus, generally designated 254, is provided. The left and right main load, and auxiliary power EPDMs 206, 208, 210 respectively include a left, right, and auxiliary bus tie relay 256, 257, 258 through which the left, right, and auxiliary buses 246, 248, 250 may be connected to the tie bus 254. An external power relay 255 is also provided to connect the tie bus 254 to an eternal power connector 253.

When the aircraft is on the ground, electric power is normally provided from the external power connector 253 or by the auxiliary power generator 204. When power is supplied by the external power connector 253, the external power relay 255 is closed to apply electric power to the tie bus 254, and the left, right, or auxiliary bus tie relays are closed to apply electric power to the left, right, or auxiliary buses 246, 248, 250. With the auxiliary generator supplying power, the auxiliary generator relay 246 is closed to power the auxiliary bus 250. If it is desired to power either the left or right main buses 246, 248 from the auxiliary bus 250, the auxiliary bus tie relay 258 and the appropriate left or right bus tie relay 256, 257 must also be closed.

When the aircraft primary propulsion engines have reached sufficient speed following being started in preparation for takeoff, the right and left generators are available to supply power. The electrical loads are then typically transferred from the external power source or the auxiliary generator 204 to the right and left generators 200, 202 by opening the left and right bus tie breakers 256, 257, closing the left and right generator relays 240, 242, and opening the external power relay 255 or auxiliary generator relay 246.

Should an engine or a generator fail in flight, all loads may be operated from one of the engine driven generators 200, 202, or by a combination of an engine driven generator and the auxiliary generator 204 by appropriate manipulation of the bus tie and generator relays 256, 257, 258, 240, 242, 244.

Current sensing means in the form of current transformers are provided within the left and right main load and auxilliary power EPDM'S 206, 208, 210 to sense current flowing into the bus means from each of the first and second input terminals, and current flowing into either the generator or tie bus means. Specifically, current transformers 300, 301; 308, 309; and 304, 305; sense current flowing into first and second inputs 230, 231; 232, 233; and 234, 235 respectively of the first and second main load and auxilliary power EPDMS. Current entering the LGR, RGR, and AGR, 240, 242, 244 from combiner bus means 236, 237, 238 are sensed by CT's 302, 310, and 306 respectively. Current entering the LBTR, RBTR, and ABTR 256, 257, and 258 are sensed by CT's 303, 311 and 307 respectively.

Additional current transformers 281, 280; 285, 284; 283, 282 external to the EPDM'S are provided to sense current flow in the neutral and output feeder cables respectively of the left, right and auxilliary generators 200, 202, 204. Additional current transformers 261, 259 are also provided at the input and output respectively of the EPR.

Current transformers 281, 280, 300, 301, 302, 303, associated with he left generator 200 within the left main EPDM 206 are operatively connected to provide information, as indicated by dashed lines in FIGS. 9 and 10, to a left generator control unit 262 (LGCU). Similarly, current transformers 283, 282, 304, 305, 306, 307 associated with the auxilliary generator 204 and auxiliary power EPDM 210 are operatively connected to an auxilliary generator control unit (AGCU) 266, and current transformers 285, 284, 308, 309, 310, 311 associated with the right generator 202 and right main load EPDM 208 are operatively connected to a right generator control unit (RGCU) 264. Current Transformers 259, 261 associated with the EPR 255 are operatively connected to an external power control unit (EPCU) 268. The LGCU, RGCU, AGCU, and EPCU provide signals to a bus control unit (BCU) (not shown) which is electrically connected to operate contactors and remotely controlled circuit breakers to reconfigure the electric power generation and distribution system as required to suit various aircraft operational modes and electrical load demands.

Figure 11:
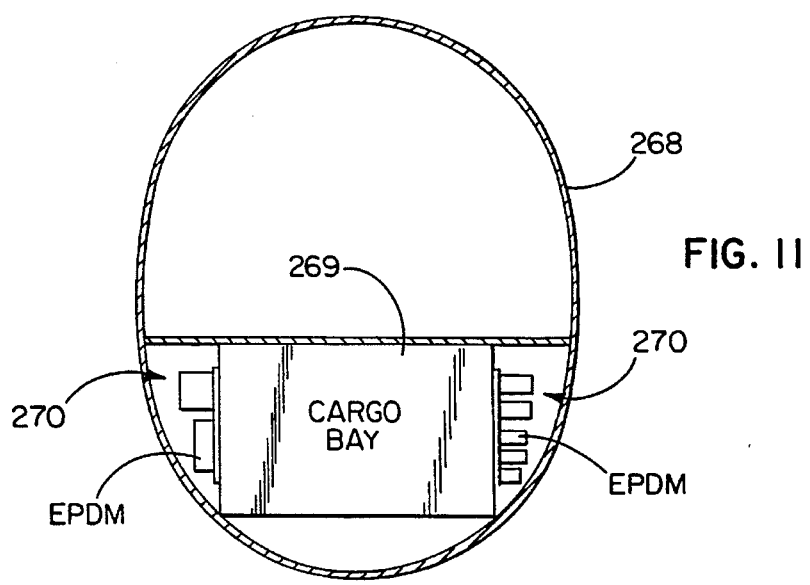
FIG. 11 is a representation of a cross-sectional view through an aircraft fuselage illustrating potential mounting locations for an electric power distribution module according to the invention.

The various EPDMs 206, 208, 210, 212, 214 of the exemplary aircraft electric power system may be co-located in a common electric power center (EPC) as on prior aircraft or may be distributed throughout the aircraft in presently under-utilized spaces, such as between the walls of a cargo bay 269 and the outer skin 268 of the aircraft, as indicated at 270 in FIG. 11. Those skilled in the art of aircraft electric power systems will readily recognize that, regardless of which approach is selected, the instant invention provides significant advantages over prior electric power systems.

Specifically, the instant invention allows the space required to house the electric power system to be reduced significantly by replacing bulky wiring used in prior electric power systems with compactly packaged bus means within the various EPDMs, and by integrating electric power system components, such as current sensing, switching and protection devices, into the EPDMs. As a result of this reduction in size, the electric power system is no longer constrained to be located in large centralized EPCs as in prior aircraft, thereby offering locational flexibility to better utilize precious space aboard the aircraft, and also thereby allowing the various electric power system components to be conveniently located remotely from one another to reduce the risk that a single event, such as an engine disintegration or explosion during flight, cannot cause a total loss of electric power on the aircraft.

As a result of the generally planar nature of the insulative support structure utilized in EPDMs according to the invention, the EPDMs may be readily mounted on a wall of a compartment. Alternatively the wall of the compartment may be partially or completely eliminated with the EPDM being configured to function as a wall panel of the compartment, or as a pressure bulkhead separating the compartment from a pressurized or un-pressurized area adjoining the compartment.

The modular nature of the EPDMs greatly facilitates initial installation of the electric power system by allowing entire EPDMs, preassembled and tested on ancillary assembly lines, to be quickly installed as a unit during assembly of the aircraft. The modular nature also facilitates repair and replacement of EPDMs by allowing EPDMs with failed components to be quickly removed and replaced on the flight line. The unit with failed components may then be sent to a repair shop for refurbishment.

In this regard, it will be understood that, although contactors, circuit breakers, fuses, etc., and the like, mounted on the various exemplary embodiments, have been described and illustrated herein with threaded, screw-type connections for making electrical connection with the bus means of the EPDMs, other types of connections, such as plug-in connectors or pins, may also be utilized with particular advantage in the instant invention to further enhance and facilitate assembly, installation, and repair of the EPDMs. Elaborating on this point, it will be understood that control connectors on such devices as RCCBs or contactors could also be configured to plug directly into connectors, blind or otherwise, connected to additional traces within the EPDM control circuit to allow further simplification of the electric power system through elimination of wire harnesses utilized in prior electric power systems to connect the RCCBs and contactors with GCUs and BCUs external to the EPDM. Still further simplification and reduction in size may be achieved by mounting the GCUs and BCUs on the EPDMs, or by integrating components of the GCUs or BCUs directly into the control circuit of the EPDM.

Figure 7:
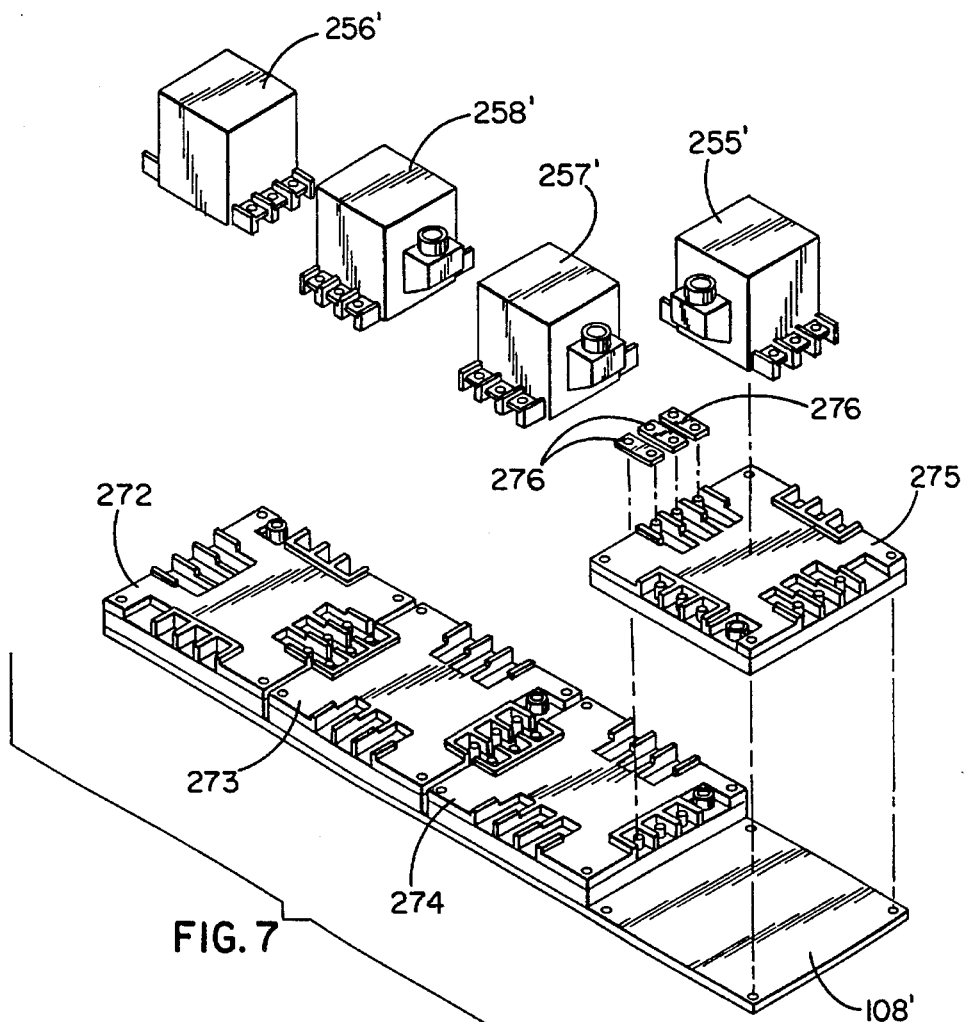
FIG. 7 is an exploded isometric view of a sixth embodiment of an electric power distribution module according to the invention.

It will also be appreciated by those skilled in the art that, although a number of exemplary embodiments of EPDMs have been described herein, the instant invention is by no means limited to those exemplary embodiments described herein, and the instant invention may actually be practiced in a virtually unlimited variety of single EPDM configurations and combinations of one or more EPDMs to form larger combination EPDMs. As an example of this variety, although the exemplary aircraft electrical system, as illustrated in FIG. 10, utilized bus tie relays 256, 258, 257 mounted on the right and left main load and auxiliary power EPDMs 206, 208, 210, respectively in combination with a discrete EPR 255 and DPCTs 259, 261, 280–285, it will be appreciated that the left, right, and auxiliary bus tie relays 256, 257, 258, and the EPR 255, together with DPCTs 259, 261, associated with the EPR 255 could also have been mounted separate from the left and right main load and auxiliary power EPDMs 206, 208, 210 on baseplates 272, 273, 274, 275 which are in turn mounted on a common mounting plate 208', and tied together with jumper bars 276 as illustrated in FIG. 7.

Figure 8:
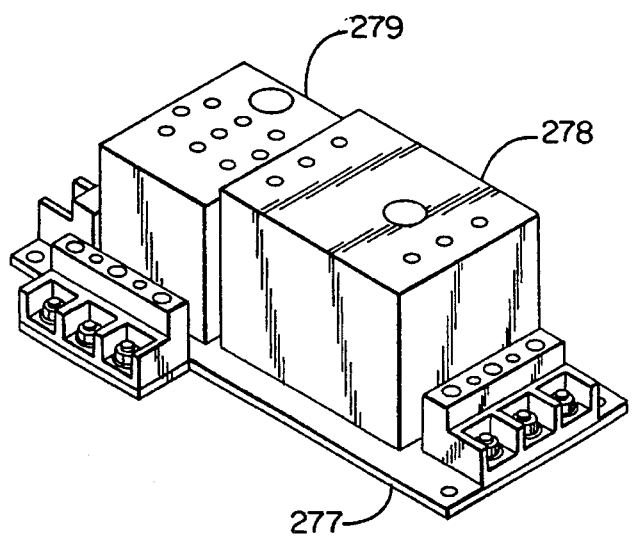
FIG. 8 is an isometric view of a seventh embodiment of an electric power distribution module according to the invention.

FIG. 8 illustrates yet another variation, according to the instant invention, in an EPDM having a load distribution baseplate 277 similar to the exemplary embodiment of FIG. 6a in that two input relays 278, 279 are included to selectively apply power to a load bus within the EPDM, but, unlike the embodiment illustrated in FIG. 6a, no circuit interrupt means are provided to selectively interrupt current flow to load devices attached to the EPDM of FIG. 8. Referring to FIG. 10, an embodiment of an EPDM, as illustrated in FIG. 8, is utilized as the left or right galley load EPDM.

It is also conceivable that, particularly where large current flows are required, the bus means of the EPDM may require cooling to prevent overheating. In such an instance, the insulative support structure of the EPDM may include cooling means (not shown) in the form of passages or impingement cooling devices such that a coolant such as air, fuel, oil, or a refrigerant may be utilized to provide the required cooling. If required, the bus means may also include heat transfer means (not shown) in the form of extended or enhanced surfaces, or integral impingement cooling devices.

As previously stated, it will be understood that although the various exemplary embodiments of EPDMs provided herein have been described and illustrated with screw-type lugs for electrical connection to other elements of the electric power systems, other types of connection means, such as plug-in terminals, may also be utilized with equal advantage. Indeed, it is possible to provide a large receptacle connected to the aircraft electric power system into which an entire EPDM may be inserted as a plug-in unit with electrical connections between the receptacle and the EPDM being provided by pairs of mating electrical contacts mounted on the receptacle and EPDM, respectively. Coolant connections, if required, are provided in similar fashion by mating fluid quick disconnects (not shown) mounted respectively on the receptacle and EPDM.

It will also be understood that, although the insulative support structures described and illustrated herein have utilized laminated plates adhesively or otherwise bonded together, other fabrication techniques and methods, such as insertion of the bus means and current sensing means into a mold cavity and filling the cavity about the bus and current sensing means with an insulative material, such as a plastic, to form a molded insulative support structure.

It will be further understood that, although the exemplary embodiments described and illustrated herein have utilized alternating current sensitive current sensing devices, such as current transformers, the instant invention may be utilized to equal advantage with direct current by substituting such devices as shunt resistors or hall effect devices for the current transformer sensing means illustrated in the exemplary embodiments.

Although the instant invention has been illustrated and described in conjunction with a particular embodiment thereof, it will be apparent to those skilled in the art that other combinations, modifications, and uses of the various features of the instant invention may be devised without departing from the spirit of the invention as set forth in the appended claims.

We claim:

1. An electric power distribution module comprising:
   a generally planar, electrically insulative support structure having first and second generally parallel faces,
   the first face of the support structure including a plurality of non-intersecting channels for receipt therein of a plurality of bus bars,
   the second face of the support structure including a plurality of non-intersecting grooves oriented transversely to the channels for receipt therein of a plurality of bus connector straps,
   the support structure thus providing electrical isolation between the bus bars and the bus connector straps,
   the support structure further including a hole extending through the support structure at a crossing of a bus bar and a bus connector strap for receipt therein of connection means adapted to pass through the hole and to electrically connect the bus connector strap to the bus bar, the bus bars, connector straps, and connection means in combination providing electrically conductive bus means having an input and an output and defining a circuit for directing a flow of electrical current from the input to the output; and current sensing means within insulative support structure for sensing a flow of electrical current in the circuit.

2. The electric power distribution module of claim 1 further including a top layer of electrically insulative material attached to the first face of the insulative support structure and a bottom layer of electrically insulative material attached to the second face of the insulative support structure.

3. The electric power distribution module of claim 2 wherein the top and bottom layers of electrically insulative material are adhesively bonded to the insulative support structure.

4. The electric power distribution module of claim 2 wherein the top and bottom layers of electrically insulative material are integrally molded with the insulative support structure about the bus means and current sensing means.

5. The electric power distribution module of claim 2 further including integral means for mounting electrical components on the insulative support structure.

6. The electric power distribution module of claim 5 wherein the electrical components are circuit interrupt means electrically connected to the bus means in a manner to conduct or interrupt the flow of current from the input to the output.

7. The electric power distribution module of claim 1 wherein the current sensing means is a shunt resistor.

8. The electric power distribution module of claim 1 wherein the current sensing means is a hall effect transducer.

9. The electric power distribution module of claim 1 wherein the current sensing means is a current transformer.

10. The electric power distribution module of claim 1 further including electrically conductive traces defining a control and sensing circuit integral with the insulative support structure and providing electrical connection between the current sensing means and an electrical connector mounted on the insulative support structure.

11. The electric power distribution module of claim 10 wherein the current sensing means are disposed within the insulative structure in a manner to sense a flow of electrical current in the connection means.

12. The electric power distribution module of claim 11 wherein the current sensing means is a plug-in device, and the insulative support structure further includes a recess for receipt therein of the current sensing means.

13. The electric power distribution module of claim 10 wherein the current sensing means is a plug-in device, and the insulative support structure includes a recess for receipt therein of the current sensing means such that, by selective insertion of the plug-in device, the flow of current in the circuit may be selectively measured at alternate locations within the circuit.

14. The electric power distribution module of claim 1 further including cooling means within the insulative support structure for transferring heat from the bus means to a coolant.

15. The electric power distribution module of claim 1 wherein the bus means includes heat transfer means.

16. A wall panel of a compartment, the wall panel comprising at least one modular unit having top, middle and bottom sections, the middle section including means for retaining at least two electrical bus elements in spaced-apart, overlapping relation;

the top and bottom sections each including means for insulating at least a portion of said bus elements from the environment apart from the distribution system;

the middle section also including at least one passageway therein for permitting electrically conductive interconnection between said bus elements;

the passageway including means for detecting and measuring the electrical current passing through the interconnection; and the middle section further including means for transferring signals representative of amount of current detected and measured to a remote location.

17. The wall panel of claim 16 wherein the compartment has an internal pressure different from an external pressure of a space adjacent the compartment, and said wall panel is a pressure bulkhead of said compartment, said wall panel having said internal pressure acting on one side thereof, and said external pressure acting on an opposite side thereof.

18. An electric power distribution module comprising:

first and second electric power distribution modules mounted on a common support plate, with each of the first and second electric power distribution modules including, a baseplate in the form of a generally planar, electrically insulative support structure having integral therewith, electrically conductive bus means having an input and an output and defining a circuit for directing a flow of electrical current from the input to the output, and current sensing means for sensing a flow of electrical current in the circuit.

19. The electric power distribution module of claim 18 further including:

first circuit interrupt means mounted on the baseplate of the first electric power distribution module and electrically connected within the circuit of the first electric power distribution module to alternatively conduct or interrupt the flow of current between the input and the output of the first electric power distribution module; and second circuit interrupt means mounted on the baseplate of the second electric power distribution module and electrically connected within the circuit of the second electric power distribution module to alternatively conduct or interrupt the flow of current between the input and the output of the second electric power distribution module.

20. The electric power distribution module of claim 18 further including electrically conductive means for electrically connecting the first and second electric power distribution modules.

21. An electric power generation and distribution system comprising:

a first source of electrical power; and a first electric power distribution module having top, middle and bottom sections, the middle section including means for retaining at least two electrical bus elements in spaced-apart, overlapping relation;

the top and bottom sections each including means or insulating at least a portion of said bus elements from the environment apart from the distribution system;

the middle section also including at least one passageway therein for permitting electrically conductive interconnection between said bus elements;

the passageway including means for detecting and measuring the electrical current passing through the interconnection;

the middle section further including means for transferring signals representative of amount of current detected and measured to a remote location;

said electrical bus elements having an input and an output and defining an electrical circuit for directing a flow of current from the input to the output;

the input of the bus element being electrically connected to the source of electrical power and the output adapted for connection thereto of an electrical load, the bus elements thereby defining a circuit for distributing a flow of electrical current from the source of electrical power to an electrical load; and circuit interrupt means mounted on the baseplate and electrically connected within the circuit to alternatively conduct or interrupt the flow of current between the input and the output.

22. The electric power generation and distribution system of claim 21 further comprising:

a second source of electrical power;

a second electric power distribution module having top, middle and bottom sections, the middle section including means for retaining at least two electrical bus elements in spaced-apart, overlapping relation;

the top and bottom sections each including means for insulating at least a portion of said bus elements from the environment apart from the distribution system;

the middle section also including at least one passageway therein or permitting electrically conductive interconnection between said bus elements;

the passageway including means for detecting and measuring the electrical current passing through the interconnection;

the middle section further including means for transferring signals representative of amount of current detected and measured to remote location;

said electrical bus elements having an input and an output and defining an electrical circuit for directing a flow of current from the input to the output;

the input of the bus elements being electrically connected to the second source of electrical power and the output adapted for connection thereto of an electrical load, the bus elements thereby defining a circuit for distributing a flow of electrical current from the second source of electrical power to an electrical load;

circuit interrupt means mounted on the baseplate and electrically connected within the circuit to alternatively conduct or interrupt the flow of current between the input and the output; and means for electrically connecting the first and second electric power distribution modules.

23. The electric power generation and distribution system of claim 22 wherein the means for electrically connecting is a tie bus means.

24. The electric power and distribution system of claim 23 wherein the tie bus means includes a tie bus relay.

25. The electric power and distribution system of claim 24 wherein the tie bus relay is mounted upon the baseplate of the first electric power distribution module.

26. The electric power and distribution system of claim 24 wherein the tie bus means further includes a second tie bus relay mounted upon the baseplate of the second electric power distribution module.

27. The electric power and distribution system of claim 23 wherein said tie bus means is a tie bus electric power distribution module electrically connected between the first and second electric power distribution modules, the tie bus electric power distribution module including, a baseplate in the form of an electrically insulative support structure having integral therewith, electrically conductive bus means having a first input/output and a second input/output and defining a circuit for directing a flow of electrical current in either direction between the input/outputs, with one input/output being electrically connected to the first electric power distribution module, and the other input/output being electrically connected to the second electric power distribution module, and current sensing means for sensing a flow of electrical current in the circuit; and circuit interrupt means in the form of a tie bus relay mounted on the baseplate and electrically connected within the circuit to alternatively conduct or interrupt the flow of current between the input/outputs.

28. The electric power generation and distribution system of claim 22 wherein the first power source is a primary generator and the first electric power distribution module is a main load electric power distribution module having circuit interrupt means in the form of a generator relay, and further wherein the second power source is an auxilliary generator and the second electric power distribution module is an auxilliary power electric power distribution module having circuit interrupt means in the form of an auxilliary generator relay.

29. The electric power generation and distribution system of claim 21 wherein the power source is a primary generator, the circuit interrupt means is a generator relay, and the electric power distribution module is a main load electric power distribution module.

30. The electric power generation and distribution system of claim 21 wherein the power source is an auxilliary generator, the circuit interrupt means is an auxilliary generator relay, and the electric power distribution module is an auxilliary power electric power distribution module.

31. The electric power generation and distribution system of claim 21 wherein the circuit interrupt means is a tie bus relay, and the electric power distribution module is a tie bus electric power distribution module.

32. The electric power generation and distribution system of claim 21 wherein the electric power distribution module is a secondary load electric power distribution module, and said secondary load electrical power distribution module is connected to receive electric power from said first electrical power distribution module.

33. The electric power generation and distribution system of claim 32 wherein the secondary load electric power distribution module is a galley load electric power distribution module.

34. The electric power generation and distribution system of claim 32 wherein the secondary load electric power distribution module is a DC load electric power distribution module.

35. The electric power generation and distribution system of claim 21 wherein the source of electrical power is an alternating current power source.

36. The electric power generation and distribution system of claim 21 wherein the source of electrical power is a direct current power source.

37. The electric power generation and distribution system of claim 21 further comprising a secondary load electric power distribution module electrically connected to the first electric power distribution module.

38. The electric power generation and distribution system of claim 37 wherein both of the first and second power sources are primary generators, and both of the first and second electric power distribution modules are main load electric power distribution modules having circuit interrupt means in the form of generator relays.

39. The electric power generation and distribution system of claim 21 wherein the electric power generation and distribution system includes means for mounting said electric power generation and distribution system in an aircraft in such a manner that said electric power generation and distribution system provides electrical power to said aircraft, and distribution of said power within said aircraft.

40. The electric power generation and distribution system of claim 21 wherein the electric power distribution module further includes electrically conductive traces defining a control and sensing circuit integral with the insulative support structure and electrically connected to the current sensing means.

41. The electric power generation and distribution system of claim 40 further including control means electrically connected to the control and sensing circuit.

42. The electric power generation and distribution system of claim 41 wherein the control means are mounted on said top section of said electric power distribution module.

43. The electric power generation and distribution system of claim 40 wherein the control and sensing circuit includes control means.

44. An electric power distribution system comprising at least one modular unit having top, middle and bottom sections, the middle section including means for retaining at least two electrical bus elements in spaced-apart, overlapping relation;

the top and bottom sections each including means for insulating at least a portion of said bus elements from the environment apart from the distribution system;

the middle section also including at least one passageway therein for permitting electrically conductive interconnection between said bus elements;

the passageway including means for detecting and measuring the electrical current passing through the interconnection; and the middle section further including means for transferring signals representative of amount of current detected and measured to a remote location.

45. The system according to claim 44 including a plurality of modular units, each being connectable to adjoining modular units through at least one bus element of each adjoining modular unit and independently detachably connected to a common base member.

46. The system according to claim 44 wherein a plurality of input bus elements, a plurality of output bus elements and a plurality of interconnecting bus elements are retained in spaced apart relation by the middle section, those interconnecting bus elements also being in overlapping relation to at least some of the input and output bus elements; and the middle section includes a plurality of passageways therein such that each interconnecting bus element is selectively connectable to at least one input bus element and at least one output bus element to permit a plurality of reconfigurable circuit paths to be established through the system.

47. An aircraft having a source of electric power and means connected to that source for distributing that electric power at centralized or decentralized locations within the aircraft, that means comprising a modular electric power distribution system including:

a plurality of detachably connectable modular units, each of which includes top, bottom and middle sections;

a plurality of planar input bus elements, planar output bus elements and planar interconnecting bus elements mounted within at least a first of those modular units;

the first of those modular units having a middle section including means for retaining each of said bus elements in spaced-apart, electrically isolated positions from each of the other bus elements in that middle section;

each of those interconnecting bus elements being disposed within that middle section so as to be overlapping at least two other bus elements;

that middle section including a plurality of passageways between overlapping bus elements which permit electrically conductive interconnection between those passageways;

at least one of those passageways including a sensor means for detecting the amount of electrical current passing through that passageway;

the middle section including means for transferring signals representative of the amount of current detected by that sensor means to a location remote from the modular unit containing that sensor means;

at least one interconnecting device configured for removable insertion into at least one of those passageways for providing an electrical connection between the overlapping bus elements connected by that passageway;

the middle section including means for insulating the electrical connection between the overlapping bus elements and the sensor means;

the top section being detachably secured to the middle section so as to restrict removal of the interconnecting device from the passageway;

the bottom section being secured to the middle section so as to insulate the interconnecting buses from the environment apart from the system;

a base member; and means for detachably connecting each of said modular units to the base member.

\* \* \* \* \*